United States Patent
Phatak

(12) 
(10) Patent No.: US 6,480,871 B1
(45) Date of Patent: Nov. 12, 2002

(54) ALGORITHM (METHOD) AND VLSI ARCHITECTURE FOR FAST EVALUATION OF TRIGONOMETRIC FUNCTIONS

(76) Inventor: Dhananjay S. Phatak, 1025 Reynolds Rd., Apt. K304, Johnson City, NY (US) 13790

( * ) Notice: Subject to any disclaimer, the term of this patent is extended or adjusted under 35 U.S.C. 154(b) by 0 days.

(21) Appl. No.: 09/287,281

(22) Filed: Apr. 7, 1999

(51) Int. Cl.$^7$ .............................................. G06F 7/548

(52) U.S. Cl. ...................... 708/440; 708/276

(58) Field of Search ................. 708/440, 276

(56) References Cited

U.S. PATENT DOCUMENTS

| | | | |
|---|---|---|---|
| 4,888,721 A | * 12/1989 | Kondoh et al. ............. | 708/490 |
| 4,910,698 A | * 3/1990 | McCartney ................. | 708/276 |
| 5,235,535 A | * 8/1993 | Nakayama .................. | 708/440 |
| 5,937,438 A | * 8/1999 | Raghunath et al. ......... | 708/276 |

OTHER PUBLICATIONS

J.E. Volder. "The CORDIC Trigonometric Computing Technique". IRE Trans. on Electronic Computers, vol. EC–8, Sep. 1959, pp. 330–334.

Walther, J.S. "A unified Algorithm for Elementary Functions". In Proceedings of the 38th Spring Joint Computer Conference, 1971, pp. 379–385.

(List continued on next page.)

*Primary Examiner*—David H. Malzahn
(74) *Attorney, Agent, or Firm*—Salzman & Levy

(57) ABSTRACT

A fast CORDIC algorithm and the resulting VLSI architecture for the evaluation of trigonometric functions are disclosed. The new method employs signed digits to represent intermediate operands and requires a constant scaling or normalization factor which can be pre-computed and made available in read-only hardware for any desired target precision (i.e., word length). The speedup is achieved by performing CORDIC iterations in parallel in two separate modules. Each module executes a "double step" or two basic CORDIC rotations at every iteration cycle. Two angles arctan $2^{-2i}$ and arctan $2^{-(2i+1)}$ are used in each step i of the method. As a result, approximately ½ steps (exactly $$\left\lceil \frac{n+3}{2} \right\rceil$$

steps) are required to evaluate sine/cosine of n bit input argument up to n bits of accuracy. The VLSI architecture consists of two "zeroing" and two "rotator" modules, each consisting of signed digit adders, latches, shifters, etc. A novel decision block controls the iterations. The new ROM look-up table stores $$\left\lceil \frac{n+3}{2} \right\rceil$$

values, each accurate to n+3 bits. For every pair of consecutive angles arctan $2^{-2i}$ and arctan $2^{-(2i+1)}$ for i=0, 1, 2, ..., $$\left\lceil \frac{n+3}{2} \right\rceil$$

only their sum and difference need be stored for the inventive double step branching CORDIC method. The result is a very fast VLSI architecture whose speedup to hardware-overhead ratio is close to 1. The double stepping method can be easily extended to the evaluation of inverse trigonometric, exponential as well as logarithm functions.

13 Claims, 10 Drawing Sheets

OTHER PUBLICATIONS

Phatak, D.S. "Double Step Branching CORDIC: A New Algorithm for Fast Sine and Cosine Generation". IEEE Transactions on Computers, vol. TC–47, No. 5, May 1998, pp. 587–602.

Takagi, N., Asada, T., and Yajima, S. "Redundant CORDIC methods with a constant scale factor for Sine and Cosine computation". IEEE Trans. on Computers, vol. 40, No. 9, Sep. 1991, pp. 989–999.

Duprat, J., and Muller, J. "The CORDIC algorithm: new results for fast VLSI implementation". IEEE Trans. on Computers, vol. TC–42, No. 2, Feb. 1993, pp. 168–178.

Koren, I. *Computer Arithmetic Algorithms*. Evaluation of Elementary Functions, Prentice–Hall Inc., Englewood Cliffs, NJ, 1993, pp. 197–217.

* cited by examiner

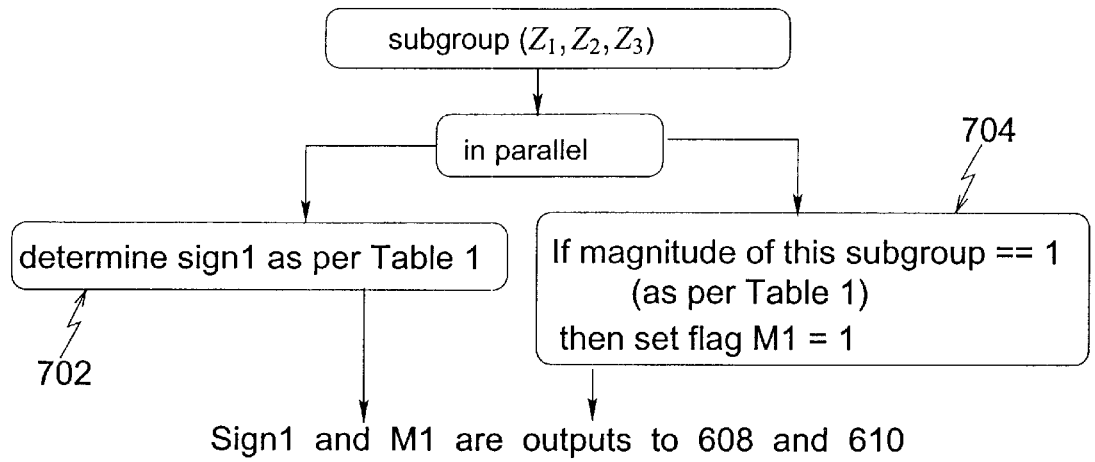
Figure 7-a
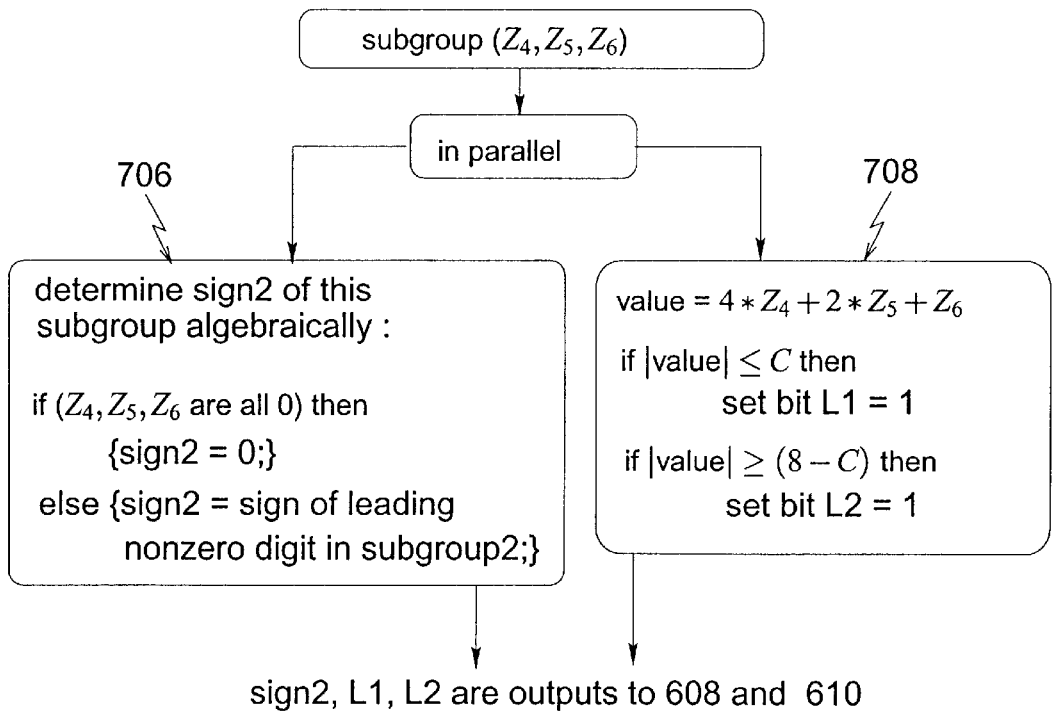
Figure 7-b

ALGORITHM (METHOD) AND VLSI ARCHITECTURE FOR FAST EVALUATION OF TRIGONOMETRIC FUNCTIONS

FIELD OF THE INVENTION

This invention relates to transcendental function evaluation, and, more particularly, to a method and apparatus for ultrafast evaluation of trigonometric functions using CORDIC rotations.

BACKGROUND OF THE INVENTION

The CORDIC algorithm was introduced by Volder [1] for computations of trigonometric functions and their inverses. In the classic reference [1], he also showed that the CORDIC method can be used for multiplication/division, as well as for conversion between binary and mixed radix number systems. Walther then demonstrated a "unified" CORDIC algorithm [2] that could be used to calculate trigonometric, exponential and square root functions along with their inverses; as well as to carry out multiply/divide operations. In essence, the CORDIC method evaluates elementary functions merely by table look-up, shift and addition operations (Following the literature and standard design practice in this area, the term "addition" is also assumed to include subtraction).

To evaluate an elementary function accurate to n bits, n pre-calculated fixed constants are all that are required to be stored in the look-up table. In some methods the number of constants to be stored can be n+1 or n+2. Each value stored in the look-up table must be accurate up to n+1 bits where the target output precision is n bits. This is a very small storage requirement and the look-up table can be realized easily in hardware.

The CORDIC algorithm has nice geometrical interpretations [1, 2]: trigonometric, exponential and multiply functions are evaluated via rotations in the circular, hyperbolic and linear coordinate systems, respectively. Their inverses (i.e., inverse trigonometric functions, logarithm and division) can be implemented in a "vectoring" mode in the appropriate coordinate system. Since its inception, CORDIC methods have been investigated by many researchers and have been employed in software and/or hardware for a variety of applications as summarized by the inventor hereof [3].

In this invention, I demonstrate an ultrafast double-stepping method applicable in the CIRCULAR ROTATION mode (used to evaluate sine/cosine/tangent) functions. I begin with an explanation of the circular rotations which are based on the iteration [5]

$$X_{i+1} = X_i - s_i Y_i 2^{-i} \quad (1)$$

$$Y_{i+1} = Y_i + s_i X_i 2^{-i} \quad (2)$$

$$Z_{i+1} = Z_i - s_i \arctan 2^{-i} \text{ where } s_i \in \{-1, 0, +1\} \quad (3)$$

and the angles $\arctan 2^{-i}$, $i=0, 1, 2, \ldots$ are known as "elementary angles" which are pre-computed and stored in a look-up table in typical CORDIC implementations. Using complex numbers, equations (1) and (2) can be rewritten as [6]

$$W_{i+1} = W_i(1+js_i 2^{-i}) \quad (4)$$

where complex variable $$W_i = (X_i + j \cdot Y_i) \text{ and } j = \sqrt{-1} \quad (5)$$

Using the polar form of complex numbers, $$W_{i+1} = W_i \sqrt{1+(s_i 2^{-i})^2} \cdot e^{j\theta_i} = W_i \cdot K_i \cdot e^{j\theta_i} \text{ where} \quad (6)$$

$$\theta_i = \arctan(s_i 2^{-i}) \text{ and } K_i = \sqrt{1+(s_i 2^{-i})^2} \quad (7)$$

Starting with $W_0$, if m iterations are carried out, then $$W_m = W_0 \cdot K \cdot e^{j\theta} \text{ where} \quad (8)$$

$$K = \prod_{i=0}^{m-1} K_i = \prod_{i=0}^{m-1} \sqrt{1+(s_i 2^{-i})^2} \text{ and} \quad (9)$$

$$\theta = \sum_{i=0}^{m-1} \theta_i = \sum_{i=0}^{m-1} \arctan(s_i 2^{-i}) \quad (10)$$

If $S_i$, $i=0, \ldots, m-1$, are selected so that $$\sum_{i=0}^{m-1} \arctan(s_i 2^{-i}) \to \theta_0 \text{ then} \quad (11)$$

$$W_m \to W_0 \cdot K(\cos \theta_0 + j \sin \theta_0) = (X_0 + jY_0) \cdot K(\cos \theta_0 + j \sin \theta_0) \text{ or} \quad (12)$$

$$X_m \to K(X_0 \cos \theta_0 - Y_0 \sin \theta_0) \text{ and} \quad (13)$$

$$Y_m \to K(X_0 \sin \theta_0 + Y_0 \cos \theta_0) \quad (14)$$

If the initial values $X_0$ and $Y_0$ are set to 1 and 0, respectively, then $$X_m \to K \cos \theta_0 \text{ and } Y_m \to K \sin \theta_0 \quad (15)$$

In general, the coefficients $s_i$ at each step of the CORDIC iteration can take any of the three values $\{-1, 0, +1\}$. If $s_i=0$ is allowed, then the scaling factor K is not a constant, but depends on the actual sequence of $s_i$ values. On the other hand, if $s_i$ can be restricted to $\pm 1$, then K is a constant (since the number of iterations m that are to be executed for a given precision are known ahead of time).

In this case, selecting $X_0 = 1/K$ and $Y_0 = 0$ yields (16)

$$X_m \to \cos \theta_0 \text{ and } Y_m \to \sin \theta_0 \quad (17)$$

To evaluate the sine and cosine of an argument $\theta_0$ up to n bits of precision, the constant-scale-factor CORDIC method therefore sets $Z_0 = \theta_0$, $X_0 = 1/K$ and $Y_0 = 0$. It then executes n iterations of equation (3), where the $s_i$ values at each step $i=1, \ldots, n$ are selected so as to take the $Z_{i+1}$ value as close to zero as possible. In other words, initial angle $\theta_0$ gets "zeroed-out". For every iteration of equation (3), once the $s_i$ value for that iteration i is determined, one iteration of equations (1) and (2) is carried out in tandem. At the end of n iterations, the X and Y variables contain the cosine and sine of argument $\theta_0$, accurate up to n bits.

This method falls under the category of "additive normalization" since the initial angle $Z_{0=\theta0}$ is zeroed out (i.e., it has at least m−2 leading zeroes in a non-redundant representation, if m iterations are executed) by adding $\pm\arctan 2^{-i}$, $i=0, \ldots, (m-1)$. In other words, in CORDIC, n+1 angles ($\arctan 2^0, \ldots, \arctan 2^{-n}$) must be utilized for n bits of precision. This can be deduced using the following identities $$\arctan 2^{-n} < \sum_{k=n+1}^{\infty} \arctan 2^{-k} < 2^{-n} \quad (18)$$

$$\arctan 2^{-n} - \sum_{k=n+1}^{n+p} \arctan 2^{-k} \leq \quad (19)$$

$$\sum_{k=n+p+1}^{\infty} \arctan 2^{-k} < \sum_{k=n+p+1}^{\infty} 2^{-k} = 2^{-(n+p)}$$

At step i if the residual angle $Z_i > 0$ then the algorithm selects $s_i = +1$ and if $Z_i < 0$ then $s_i = -1$ so that the magnitude of the residual angle is constantly being reduced toward zero. For this method to work, the initial angle must satisfy $$|Z_0| \leq \sum_{k=0}^{\infty} \arctan 2^{-k} = 1.74328662 \quad (20)$$

This range covers all angles of practical interest since $\pi/2 \approx 1.5708 < \sum_{k=0}^{\infty} \arctan 2^{-k}$.

With the introduction of (redundant) signed-digit representations [3] the addition becomes carry-free. That is, the addition takes a small fixed amount of time, irrespective of the wordlength, thus offering a potential for significant speedup. To fully exploit the speed advantage gained by using signed digits, the sign detection of the residual angle also must be performed in a constant (and small) time delay independent of the precision/wordlength. The next action depends on whether the current residual angle is positive or negative. This in turn implies that only a fixed number of leading digits can be processed to determine the sign of the residual angle.

In most methods [4, 5] a window of three (leading) digits turns out to be sufficient to determine the sign. At each iteration, the window shifts right by one digit position. If at least one of the digits in the window of interest is non-zero, the sign of the residual angle can be determined to be ±1. If the sign is ±1, the next elementary angle (arctan $2^{-i}$ at step i) should be subtracted; if the sign is −1, the next elementary angle should be added (for the zeroing process). A problem occurs when all the digits in the window of interest are zero or in other words when the residual angle has many leading zeroes, so that merely analyzing the window of three (leading) digits cannot determine whether its sign is +1 or −1. Ideally, in this case, one should select $s_i = 0$ and neither add nor subtract the elemental angle for that step. However, if the coefficients $s_i$ are restricted to $\{-1, +1\}$ (to render the scaling factor K to be a constant) then sign detection of the angle being zeroed becomes the bottleneck: it could require the examination of a large number of digits (possibly the entire word length). In essence, if the residual angle $Z_i$ has many leading zeroes, the decision whether to add or subtract the next elementary angle arctan $2^{-i}$ can be made only after examining the first non-zero digit. In general this might imply scanning the entire word length, in which case the advantage due to constant time addition using signed digits is lost.

Takagi, Asada and Yajima proposed two different methods [4] viz., the method of "double rotation" and the method of "correcting rotations" to overcome this problem. However, these methods require extra iterations which make them slow.

Duprat and Muller proposed a version of CORDIC algorithm [5] that lets the coefficient $s_i$ be restricted to ±1, without the need for extra rotations. This is achieved by performing two CORDIC rotations in parallel at each step and retaining the correct result at the end of each step. Thus, extra hardware is needed. When the residual angle $Z_i$ has many leading zeroes, so that its sign cannot be determined by analyzing only a fixed number of most significant digits, Duprat and Muller's algorithm initiates two sequences of computations: one assuming $s_i = +1$ and the other assuming $s_i = -1$. It might appear that this branching could in turn lead to further branchings down the line. However, they showed that further branchings are not possible and that a branching terminates eventually (with both computation sequences converging) or, if it does not terminate till the end, then both the modules have the correct result (accurate up to the desired number of bits of precision). The main drawback of the Duprat/Muller method is that the additional hardware is idle most of the time. In that method, the two modules perform different computations only when in a branching. Otherwise they perform identical computations, which means one of the modules is not being utilized at all.

SUMMARY OF THE INVENTION

The basic idea of executing two sequences of computation in parallel can be improved upon, making it possible to determine two coefficients ($s_i$ and $s_{i+1}$) at each step of the CORDIC iteration. Hence the name "Double Step Branching CORDIC". In this inventive method, the modules perform distinct computations at each step and a decision block retains the correct result. The amount of additional hardware required by the inventive method is minimal; while the hardware utilization is better and the potential speedup is significant.

The new method and apparatus therefore achieves the following objectives:

(1) to accomplish each add/subtract operation in constant time, independent of the wordlength.

This is achieved by using intermediate signed digit representations for the operands, which makes the addition/subtraction carry free;

(2) to render the scaling factor K to be a constant. This is achieved by restricting $s_i$ to ±1;

(3) to achieve maximum possible speed. The inventive method achieves this speed by using two successive elementary angles arctan $2^{-2i}$ and arctan $2^{-(2i+1)}$ at each iteration step i, thereby executing two conventional rotations in a single step. For every such pair of angles, their sum and difference {arctan $2^{-2i}$+arctan $2^{-(2i+1)}$} and {arctan $2^{-2i}$−arctan $2^{-(2i+1)}$} is pre-computed and stored in the ROM look-up table to expedite the process by reducing the number of add/subtract operations during the iterations. Thus, the number of iterations is half of that in a conventional method.

(4) to minimize hardware overhead. This is achieved by the novel implementation of the ROM look-up table which comprises a major portion of the hardware. As noted before, instead of storing the individual angles in each pair, their sum and difference are stored. Thus the size of the look-up Table remains the same as in the conventional method. Other components such as signed digit adders, latches, barrel shifters, etc. are also required as in conventional methods. Consequently the only additional hardware required by this method is due to a few latches and due to the fact that the decision block is slightly more complex. This overhead is small since the full word length (i.e., n bits long) adders, shifters, multiplexors and ROM look-up table constitute the major components; and (5) to maximize hardware utilization. In this method, all modules are always performing useful computations. In contrast, in Duprat and Muller's conventional method, one of the modules is inactive until that algorithm is in a branching.

BRIEF DESCRIPTION OF THE DRAWINGS

FIG. 7-a shows the processing required for the higher significant half of the sign-evaluation-window FIG. 7-b illustrates the processing of lower significant half of the sign-evaluation-window.

DESCRIPTION OF THE PREFERRED EMBODIMENTS

This invention discloses a new algorithm (method) and hardware (apparatus) for ultrafast-fast sine and cosine evaluation. It is a constant-scale-factor radix 2 (binary) CORDIC algorithm which can be easily implemented in VLSI hardware and can be readily incorporated in digital computer arithmetic and logic units (ALU) or floating point units (FPU) or in digital signal/image processors or controllers.

Figure 1:
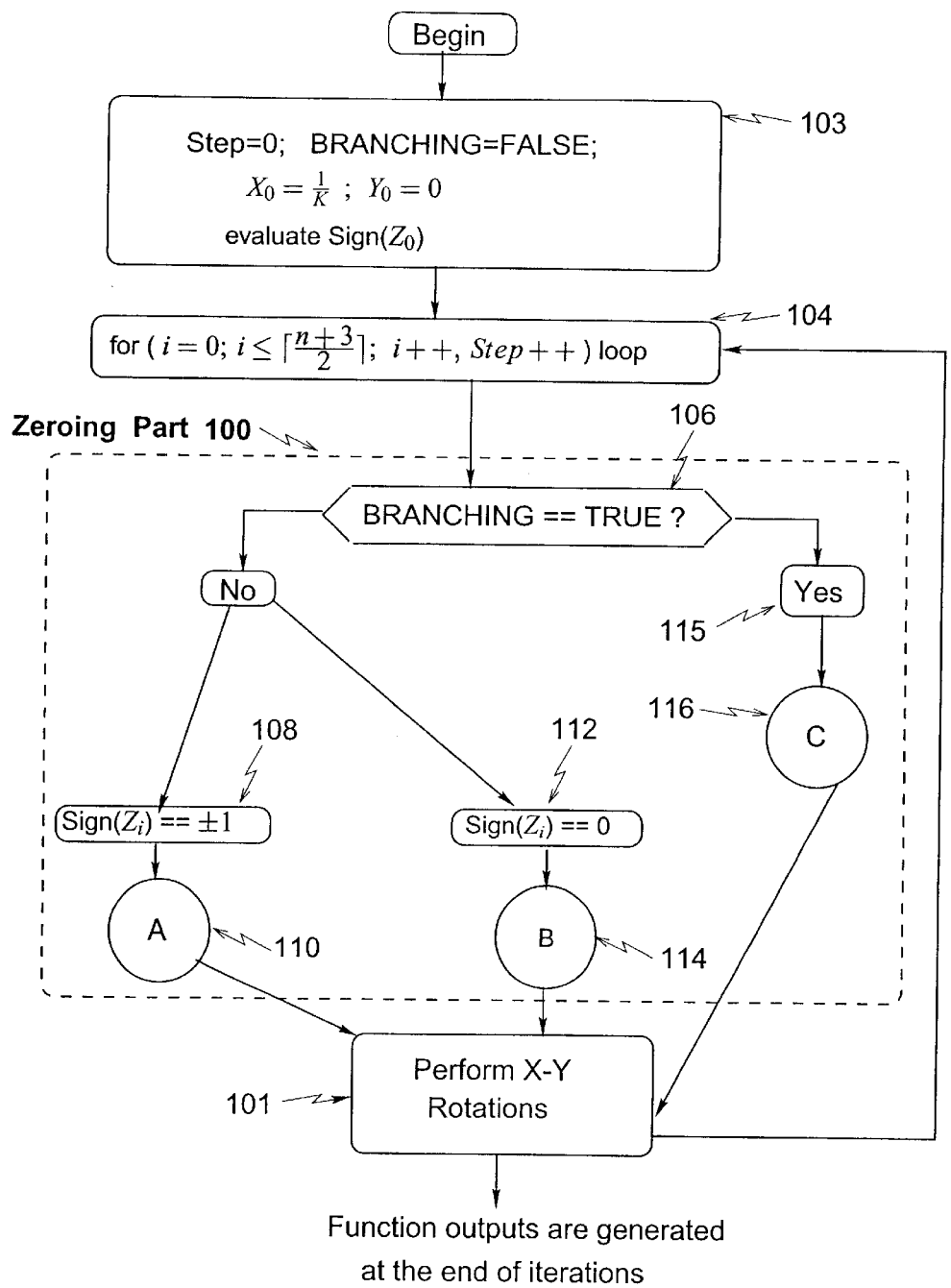
FIG. 1 shows the overall flowchart of the method of the invention.

The overall flowchart of the algorithm is shown in FIG. 1. The algorithm accepts an n bit angle $Z_0$ in the range specified by equation (20) as the input argument. After the initializations in block 102, the algorithm executes $$\left\lceil \frac{n+3}{2} \right\rceil$$

iterations. The notation $\lceil x \rceil$ denotes "ceiling of x"=smallest integer $\geq x$. Iteration or step numbers are denoted by the running or dummy index i. Conceptually, each iteration performs the operations in the zeroing part, block 100, followed by operations in the rotator part, block 101. The zeroing part essentially selects a sequence of signs (+1s and −1s) which determines the exact sequence of add and subtract operations of the elementary angles required to zero out the given initial argument. The rotator part 101 works in tandem with the zeroing part 100: using the signs determined by the zeroing part 100, the rotator part in effect performs the cross-coupled iterations (similar to those in equations (1) and (2)). At the end of the iterations, the sine and cosine values are available as the outputs of the rotator block. These values can be proven to be accurate up to at least n bits [3]. In the following, the zeroing block 100 is explained first followed by the rotator block 101.

The Zeroing Block

Figure 2:
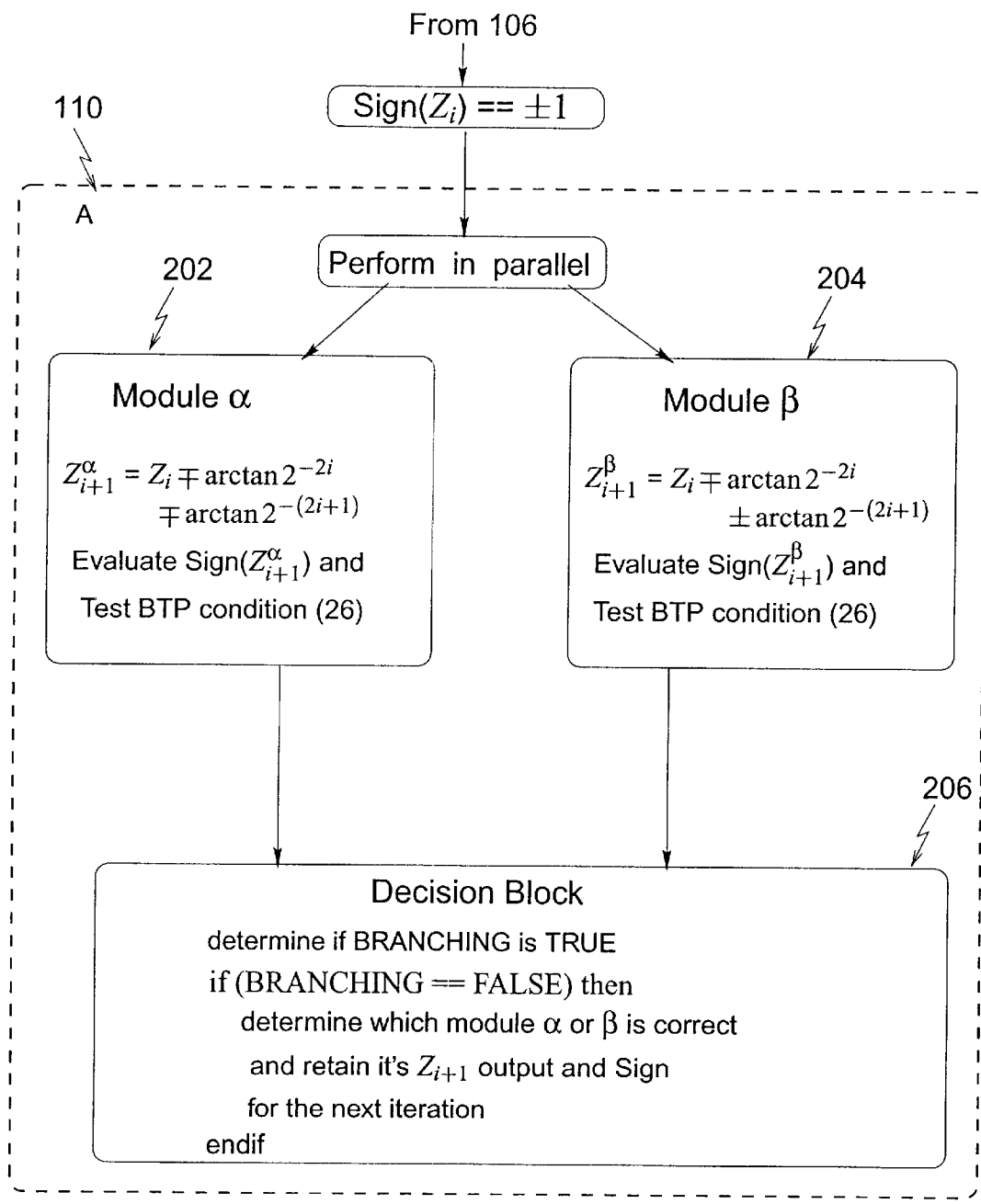
FIG. 2 shows the flowchart for iteration or step i for the case when sign evaluation returns ±1.
Figure 3:
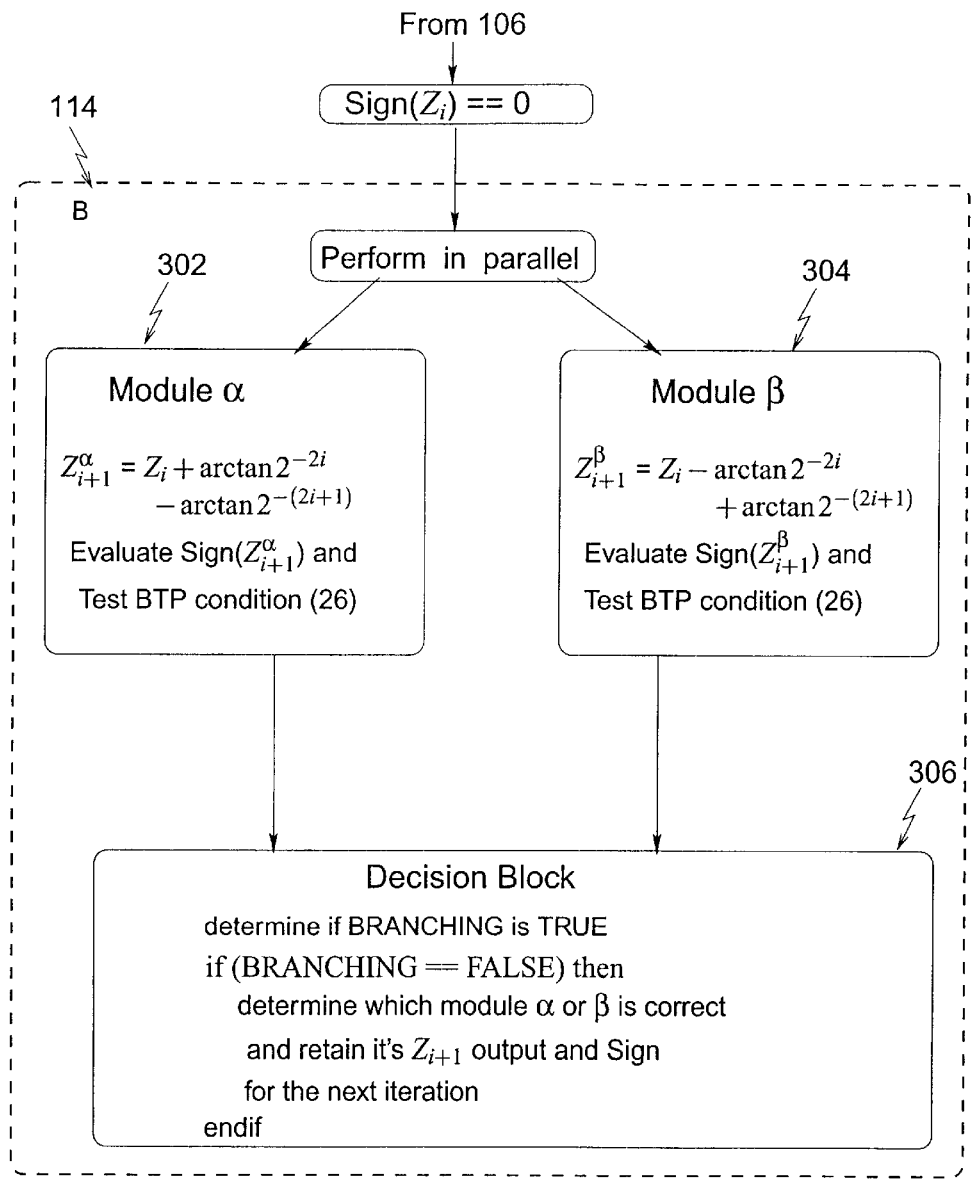
FIG. 3 shows the flowchart for step i for the case when sign evaluation returns 0.
Figure 4:
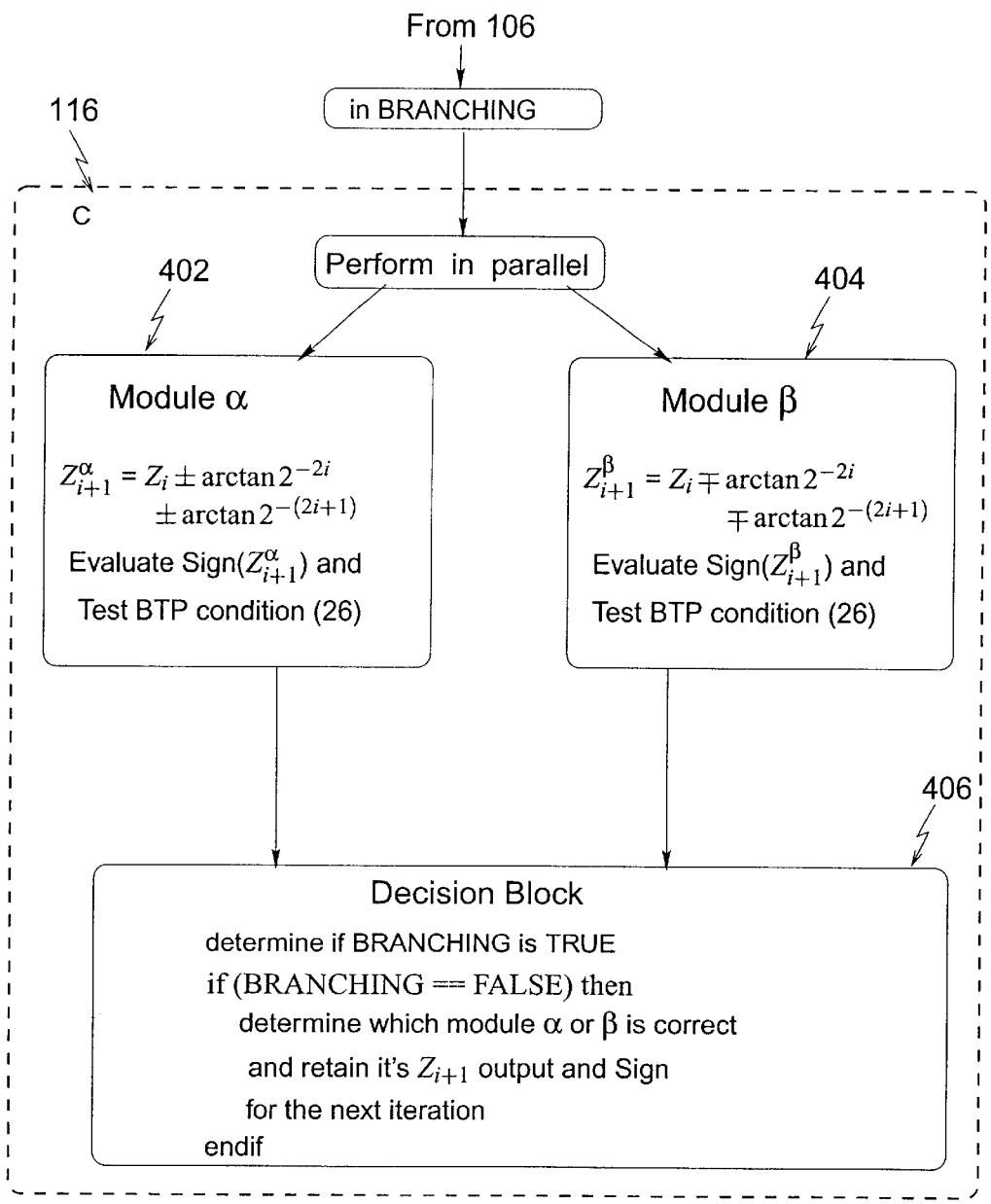
FIG. 4 shows the flowchart for step i when the algorithm is in a branching.

In each iteration of the loop 104, 100, 101, in FIG. 1, the algorithm first executes the operations in the zeroing part 100. There, the algorithm first checks whether it is currently in a "BRANCHING", step 106. If not, the algorithm checks the sign of the residual angle $Z_i$ (also abbreviated as "residue") at the current iteration, step 112. The sign can take only 3 values: {−1, 0, +1}. If the sign is non-zero (i.e., ±1), step 108, the steps shown in greater detail in the flowchart in FIG. 2 are executed, step 110. If the sign is zero, step 112, the steps shown in greater detail in the flowchart disclosed in FIG. 3 are executed, step 114. If the algorithm is in a branching, step 115, then operations disclosed in greater detail in the flowchart in FIG. 4 are executed, step 116.

In each case 108, 112, 115 two independent computations are performed in parallel in every iteration. The modules that perform the two distinct computations are labeled as Module $\alpha$ and Module $\beta$ in FIGS. 2, 3, 4 and 9. After the two computations are performed in parallel by the two modules, a decision block checks whether one of the two computations is incorrect or whether both are correct, which leads to a branching. If one of the two computations is found to be incorrect, it is discarded and the result of the other computation is retained as the correct value of the residue for the next iteration.

The inputs and outputs of Module $\alpha$ (as well as any other variables/attributes associted with it) are designated with superscript $\alpha$, while those of Module $\beta$ are designated with superscript $\beta$. The subscript indicates the step or iteration number. The angles that are processed by these modules are denoted by the letter "Z". For instance, $Z_i^\alpha$ denotes the angle input to Module a at the beginning of step i. Likewise, $Z_{i+1}^\beta$ denotes the angle output of Module $\beta$ at the end of step i. The variable $Z_i$ without any module specific superscripts refers to the correct residue at step i. For example, $Z_0$ is the residual angle at the beginning. If the algorithm is not in a branching, then the input residual angle at step i is the same for both modules. That is, $Z_i^\alpha = Z_i^\beta = Z_i$. When the algorithm is in a branching, $Z_i^\alpha \neq Z_i^\beta$.

To illustrate the method I adopt the convention to label the iterations (or steps) from zero onwards (i.e., step 0, step 1, . . . etc.) where step i utilizes arctan $2^{-2i}$ and arctan $2^{-(2i+1)}$ to generate $Z_{i+1}$ from $Z_i$. With this notation, step 0 generates $Z_1^\alpha$ and $Z_1^\beta$ from initial angle $Z_0$ by using arctan $2^{-0}$ and arctan $2^{-1}$; step 1 generates $Z_2^\alpha$ and $Z_{2\beta}$ from $Z_1$ by using arctan $2^{-2}$ and arctan $2^{-3}$ and so on.

At step i, each module utilizes two elementary angles arctan $2^{-2i}$ and arctan $2^{-(2i+1)}$ to zero out the residue $Z_i$, i.e., reduce its magnitude as much as possible. Note that arctan $2^{-0}$ through arctan $2^{-(2i-1)}$ have already been used in prior steps 0, 1 . . . (i−1). Since each elementary angle can be added or subtracted, there are four possibilities of utilizing the two elementary angles: ({add, add }, {add, subtract}, {subtract, add}, {subtract, subtract}). By selecting the + or − signs to determine whether to add or subtract the elementary angles, each module executes one of the four possible computations $$\text{Module } \alpha: Z_{i+1}^\alpha = Z_i^\alpha \pm \arctan 2^{-2i} \pm \arctan 2^{-(2i+1)} \quad (21)$$

$$\text{Module } \beta: Z_{i+1}^\beta = Z_i^\beta \pm \arctan 2^{-2i} \pm \arctan 2^{-(2i+1)} \quad (22)$$

To understand the main idea behind the algorithm, assume that at the end of step i−1 the system is not in a branching, i.e., $Z_i^\alpha = Z_i^\beta = Z_i$. For the purpose of illustration, also assume that sign of $Z_i$ can be unambiguously determined to be positive, i.e., $Z_i > 0$, step 108. Hence the flowchart in FIG. 2 is executed. In that case, arctan $2^{-2i}$ must be subtracted, since the goal is to try to reduce the magnitude of the residue at each step. In the conventional method, this subtraction is performed by both modules. In other words, both modules perform the same computation which means that one of the two modules is not utilized. Next, in the conventional method, the sign is determined again, to determine whether to add or subtract the next angle, arctan $2^{-(2i+1)}$.

In my new method, the two available modules are put to full use as follows:

block 202: $Z_{i+1}{}^\alpha = Z_i$-arctan $2^{-2i}$-arctan $2^{-(2i+1)}$ operation abbreviated $\{-,-\}$ (23)

block 204: $Z_{i+1}{}^\beta = Z_i$-arctan $2^{-2i}$+arctan $2^{-(2i+1)}$ operation abbreviated $\{-,+\}$ (24)

Both modules then determine the signs of $Z_{i+1}{}^\alpha$ and $Z_{i+1}{}^\beta$ in parallel. Note that a "sign" can take any one of the three values $\{-1, 0, +1\}$ and hence requires two bits to represent it. In other words both sign($Z_{i+1}{}^\alpha$) and sign($Z_{i+1}62$) require two bits each. The modules also evaluate a (single) bit flag to indicate whether the residue satisfies the branch-termination-predictor (BTP) condition which is explained hereinbelow.

If sign($Z_{i+1}{}^\alpha$) is positive, (i.e., a $\{-,-\}$ operation still leaves a positive residue), then Module $\alpha$ is correct. In this case a $\{-,+\}$ operation that Module $\beta$ performed must also yield a positive residue, which is higher in magnitude than the residue of Module $\alpha$ which is deemed to be correct and copied by Module $\beta$ prior to the next iteration. Similarly if a $\{-,-\}$ operation leads to a "zero sign" (i.e., the residue $Z_{i+1}{}^\alpha$ has leading zeroes which implies it has a small magnitude), then that operation was the correct one. Finally when a $\{-,-\}$ operation leads to a negative residue, then the next action depends on the sign of the residue $Z_{i+1}{}^\beta$ in the other module obtained by a $\{-,+\}$ operation: if sign($Z_{i+1}{}^\beta$) is −1 or 0 then it is correct; otherwise, both modules are correct and the algorithm enters a branching. The operations of the decision block 206 can be exactly specified by the following pseudo-code, which can be readily implemented in VLSI hardware.

| Decision Block 206 |
|---|
| if ( Sign($Z^\alpha_{i+1}$) == Sign($Z_i$) ) then { Module $\alpha$ is correct; } |
| else if ( Sign($Z^\alpha_{i+1}$) == 0 ) then { Module $\alpha$ is correct; } |
| else { |
|     if (Sign($Z^\beta_{i+1}$) == −Sign($Z_i$) \|\| Sign($Z^\beta_{i+1}$)== 0) then |
|     { Module $\beta$ is correct;} |
|     else { |
|         if ( any module satisfies condition (26) ) then { it is correct; } |
|         else { |
|             BRANCHING = TRUE; |
|         } |
|     } |
| } |
| if (BRANCHING != TRUE) then { |
|     Correct Module's $Z_{i+1}$ output, sign |
|     and other attributes are copied by the other module |
| } |

Similarly, the flowchart in FIG. 3 presents the procedure to be followed when sign($Z_i$)=0, step 112 (FIG. 1), which indicates that the window of interest has all zeroes in it. This happens when the residue $Z_i$ has many leading zeroes in it. Hence, it is not possible to determine whether $Z_i$>0 or $Z_i$<0 merely by analyzing a fixed number of leading digits. In contrast if sign($Z_i$)=+1 then $Z_i$>0 is guaranteed. Likewise and if sign($Z_i$)=−1 then $Z_i$<0.

The leading zeroes in $Z_i$ suggest a small magnitude, in which case adding (or subtracting) both arctan $2^{-2i}$ and arctan $2^{-(2i+1)}$ will lead to overcorrection. In other words, when the magnitude is small, $\{+,+\}$ and $\{-,-\}$ operations are incorrect. Hence, in this case one module ($\alpha$) attempts a $\{+,-\}$ while the other module ($\beta$) performs $\{-,+\}$.

Both modules then evaluate the sign of the new residue and also evaluate the BTP condition flag. Decision block 306 then decides which of the modules performed the correct operation. Both can be correct, in which case the algorithm enters a branching. The operation of decision block 306 is specified by the following pseudo-code:

| Decision Block 306 |
|---|
| /* in this case $Z^\alpha_{i+1}$ > 0 and $Z^\beta_{i+1}$ < 0 */ |
| if ( Sign($Z_{i+1}$) == 0 is true for any module ) then { |
|     that module is correct; goto End_decision; |
| } |
| if ( any module satisfies condition (26) ) then { |
|     that module is correct; goto End_decision; |
| /* if both modules satisfy the condition, arbitrarily pick any one */ |
| } |
| BRANCHING = TRUE; |
| End_decision: |
|     if (BRANCHING != TRUE) then { |
|         Correct Module's $Z_{i+1}$ output, sign |
|         and other attributes are copied by the other module |
|     } |

The flowchart in FIG. 4 shows the procedure when the algorithm is in branching. Note that in this case the inputs to both modules are distinct, i.e., $Z_i^\alpha \ne Z_i^\beta$. In this case, it can be proved [3] that the correct operations are $\{+,+\}$ and $\{-,-\}$ as shown in 402 and 404. Note that corresponding to a ± in block 402 there is a ∓ in block 404. This indicates that if block 402 performs $\{+,+\}$, then block 404 performs $\{-,-\}$ and vice versa. Which block performs which operation depends on the sign of input residue. If $Z_i^\alpha$>0 then Module $\alpha$ performs $\{-,-\}$ and if $Z_i^\alpha$<0 then Module $\alpha$ performs $\{+,+\}$. Because the algorithm is in a branching it can be proved that $Z_i^\beta$ must have a sign opposite that of $Z_i^\alpha$. Hence, Module $\beta$ performs complementary operations. Decision block 406 is specified by the following pseudo-code:

| Decision Block 406 |
|---|
| BRANCHING = FALSE; |
| if ( Sign($Z_{i+1}$) == 0 is true for any module ) then { |
|     that module is correct; goto End_decision; |
| } |
| if (Sign($Z^\alpha_{i+1}$) == −Sign($Z^\alpha_i$)) then {Module $\alpha$ is correct; goto End_decision;} |
| if (Sign($Z^\beta_{i+1}$) == −Sign($Z^\beta_i$)) then {Module $\beta$ is correct; goto End_decision;} |
| if ( any module satisfies condition (26) ) then { |
|     that module is correct; goto End_decision; |
| /* if both modules satisfy the condition, arbitrarily pick any one */ |
| } |
| BRANCHING = TRUE; /* double step in branching in the next iteration */ |
| End_decision: |
|     if (BRANCHING != TRUE) then { |
|         Correct Module's $Z_{i+1}$ output, sign |
|         and other attributes are copied by the other module |
|     } |

Figure 5:
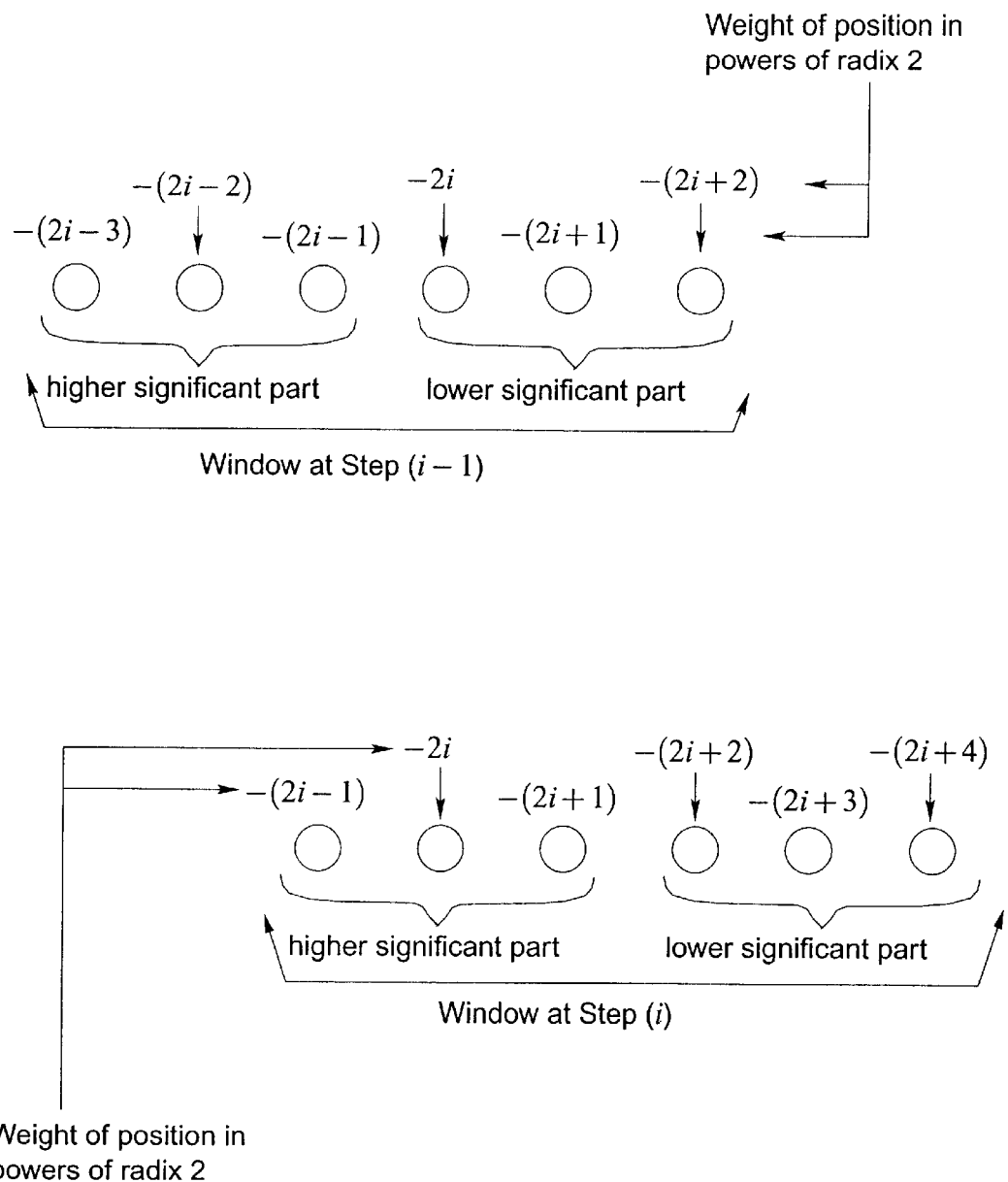
FIG. 5 shows the "sign-evaluation-window" of six digits and illustrates how the window shifts by two digit positions after executing each iteration in accordance with the invention.
Figure 6:
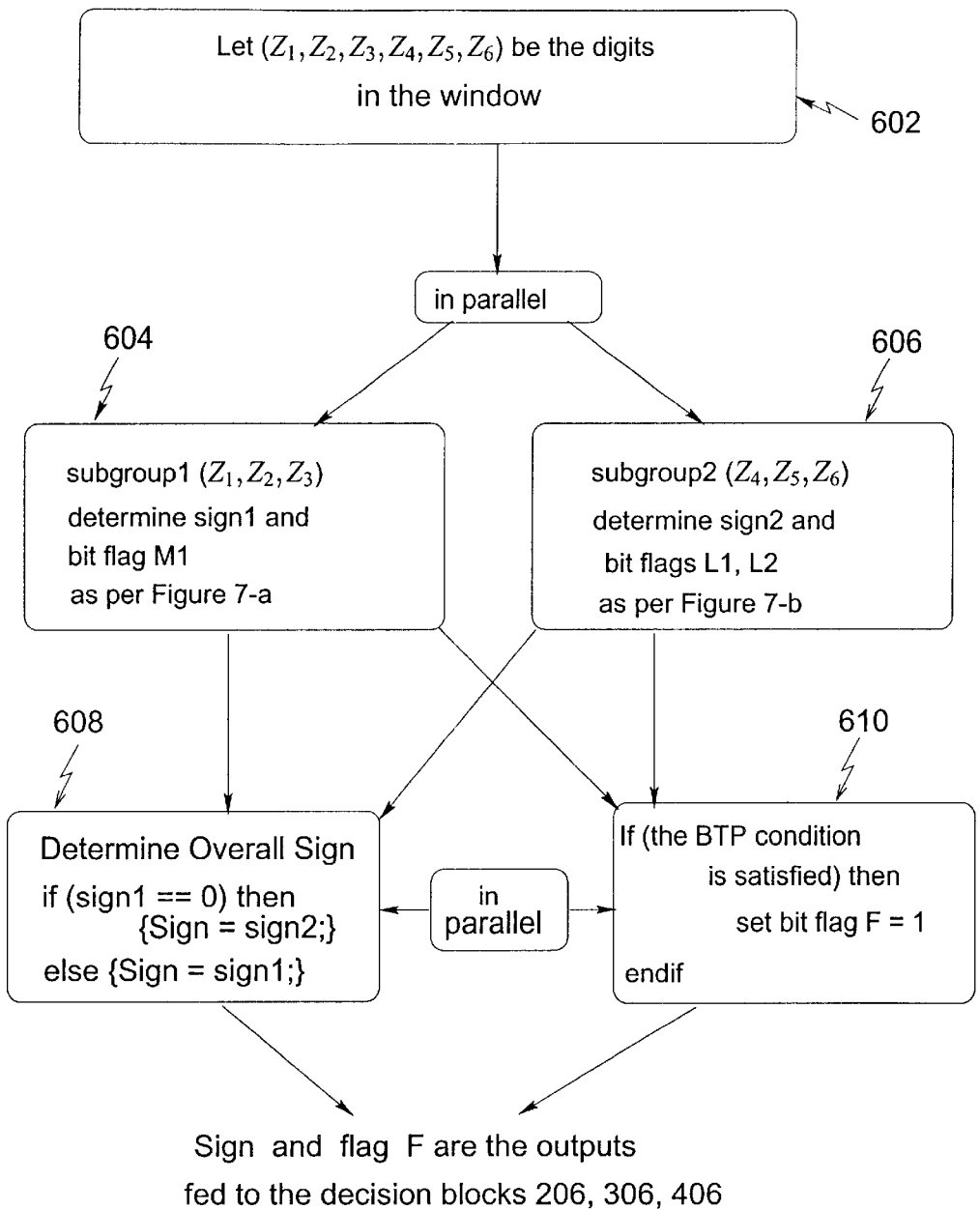
FIG. 6 illustrates the sign evaluation procedure.

The "sign evaluation" operation is an important part of the new method and is explained next. FIG. 5 shows the positions of the sign-evaluation-window of six digits that is used to determine the sign of the residues at Steps (i–1) and i, respectively. The Flowcharts in FIGS. 2, 3, and 4 show the operations for iteration i, which uses two elementary angles arctan $2^{-2i}$ and arctan $2^{-(2i+1)}$. The sign evaluation of $Z_{i+1}^\alpha$ (in blocks 202, 302, and 402 in FIGS. 2, 3 and 4) and $Z_{i+1}^{62}$ (in blocks 204, 304, and 404 in FIGS. 2, 3 and 4) utilizes six digits in positions $2^{-(2i-1)}$ through $2^{-(2i+4)}$, as shown in FIG. 5. The window at iteration or step i is shifted by two positions with respect to the window at iteration (i–1). As the algorithm double steps in each iteration, the sign-evaluation-window also shifts by two positions, reflecting the fact that (approximately) two digits of the residual angle are zeroed out each time. The residual angle starts having smaller and smaller magnitude (i.e., larger and larger number of leading zeroes) which is why the sign-evaluation-window also keeps shifting, in order to track digits of smaller and smaller weight to correctly evaluate the sign of the residue, as the algorithm progresses. FIG. 6 explains the sign evaluation procedure in more detail. The six digits in the sign-evaluation-window, Block 602, are divided into two subgroups of three digits each and are handled in parallel, blocks 604 and 606. Each signed digit can assume any of the three values {–1, 0, +1} and therefore needs two bits to represent it. Consequently, three input digits correspond to six input bits. Block 604 takes the three more significant digits (six bits) in the sign-evaluation-window as its inputs. It generates a sign (labeled Sign1) and a bit flag M1 as the outputs. The sign can also take any of the three values {–1, 0, +1} and therefore needs two bits to represent it. Bit M1 is set to 1 only if the magnitude of the subgroup of three digits handled by block 604 is 1. The processing within block 604 is further detailed in FIG. 7-a. The determination of Sign1 in block 702 and the determination of bit M1 in block 704 can be done in parallel for ultrafast execution. Complete rules for determining Sign1 and bit flag M1 are disclosed in Table 1.

TABLE 1

Rules for determination of Sign and Magnitude of the subgroup of 3 more significant digits in the Sign-Evaluation-Window at step (i – 1). A "x" indicates a "don't care", when the corresponding digit combination cannot occur in the residual angle.

| $Z_{2i-3}$ | $Z_{2i-2}$ | $Z_{2i-1}$ | Implied leading digit | Sign | Magnitude | comment |
|---|---|---|---|---|---|---|
| $\bar{1}$ | $\bar{1}$ | $\bar{1}$ | 1 | + | 1 | $\bar{1}$ denotes –1 |
| $\bar{1}$ | $\bar{1}$ | 0 | 1 | + | 2 | |
| $\bar{1}$ | $\bar{1}$ | 1 | 1 | + | 3 | |
| $\bar{1}$ | 0 | $\bar{1}$ | 1 | + | 3 | |
| $\bar{1}$ | 0 | 0 | x | x | 4 | (impossible, violates "coarser" bound) |
| $\bar{1}$ | 0 | 1 | $\bar{1}$ | – | 3 | |
| $\bar{1}$ | 1 | $\bar{1}$ | $\bar{1}$ | – | 3 | |
| $\bar{1}$ | 1 | 0 | $\bar{1}$ | – | 2 | |
| $\bar{1}$ | 1 | 1 | $\bar{1}$ | – | 1 | |
| 0 | $\bar{1}$ | $\bar{1}$ | $\bar{1}$ | – | 3 | |
| 0 | $\bar{1}$ | 0 | $\bar{1}$ | – | 2 | |
| 0 | $\bar{1}$ | 1 | $\bar{1}$ | – | 1 | |
| 0 | 0 | $\bar{1}$ | $\bar{1}$ | – | 1 | |
| 0 | 0 | 0 | 0 | 0 | 0 | (need to look at next 3 digits) |
| 0 | 0 | 1 | 1 | + | 1 | |
| 0 | 1 | $\bar{1}$ | 1 | + | 1 | |
| 0 | 1 | 0 | 1 | + | 2 | |
| 0 | 1 | 1 | 1 | + | 3 | |
| 1 | $\bar{1}$ | $\bar{1}$ | 1 | + | 1 | |
| 1 | $\bar{1}$ | 0 | 1 | + | 2 | |
| 1 | $\bar{1}$ | 1 | 1 | + | 3 | |
| 1 | 0 | $\bar{1}$ | 1 | + | 3 | |
| 1 | 0 | 0 | x | x | 4 | (impossible, violates "coarser" bound) |
| 1 | 0 | 1 | $\bar{1}$ | – | 3 | |
| 1 | 1 | $\bar{1}$ | $\bar{1}$ | – | 3 | |
| 1 | 1 | 0 | $\bar{1}$ | – | 2 | |
| 1 | 1 | 1 | $\bar{1}$ | – | 1 | |

Block 606 accepts three lower significant digits (six bits) in the sign-evaluation-window and generates Sign2 (a sign requiring two bits to represent it) and two more bits L1 and L2. The processing within block 606 is further explained in FIG. 7-b. Once again, the generation of Sign2 in block 706 and bits L1, L2 in block 708 can be done in parallel for high speed operation. The notation |value| in block 708 denotes "the absolute value or magnitude of value" and is defined as:

$$|x|=x \text{ if } x\geq 0; \quad |x|=-x \text{ if } x<0.$$

In other words, the absolute value simply ignores a negative sign if present. In block 708 the letter "C" denotes a constant which can take any one of the two values {5, 6}. It is used in determining whether the branch-termination-predictor condition is satisfied. This condition is explained hereinafter.

Outputs of 604 (Sign1, M1) and outputs of 606 (Sign2, L1, L2) are then fed to blocks 608 and 610 which operate in parallel. The overall sign is determined, block 608, as per the pseudo-code indicated in FIG. 6, whereas the branch-termination-predictor condition is checked, block 610. This condition is explained next.

In the conventional method, when in a branching, one module keeps adding and the other keeps subtracting the elementary angles one at a time since the conventional method can only single step in each iteration. These additions or subtractions are continued as long as the signs of next residues continue to be same as those of the previous ones. In the present double stepping method, however, the operation to be performed when in a branching is adding (subtracting in the other module) two angles at a time. If the sign of the next residue remains the same as the previous one despite adding (subtracting) two angles, then that module still indicates a continuation of branching.

However, if the sign does change, indicating a termination of branching, there is no quick way of determining whether (i) the sign switched as a result of adding (subtracting) the first angle, or (ii) it remained the same after using the first angle and switched only after using the second angle. If (i) happens to be true, then the second angle has been used incorrectly. There is no way to resolve this situation, except to back-track if this was allowed to happen. Hence, before taking a double step when in (or at the start of) a branching, the inventive method detects whether the first step itself would terminate the branching. This is achieved by checking the branch-termination-predictor (BTP) condition during the sign detection and using that signal in the decision block at each iteration.

The branch-termination-predictor condition predicts an end of branching if any of the two residue magnitudes $|Z_{i+1}{}^\alpha|$ or $|Z_{i+1}{}^\beta|$ satisfies

|residue magnitude| < C·2$^{-(2i+4)}$ where C ∈ {5, 6}  (25)

The inventive algorithm (method) works correctly for both possible values of C (C=5 as well as C=6). In actual hardware realization, therefore, whichever value of C leads to a smaller/faster/better circuit can be used.

This condition can be translated into a form suitable for VLSI hardware implementation as follows:

[{(sign of more significant part==0) && (magnitude of less sig. part ≥C)}

||{(magnitude of more sig. part==1) && (magnitude of less sig. part ≥(8−C))

&&(sign of less sig. part==−(sign of more sig. part))}]==TRUE  (26)

The above condition can be checked readily in hardware by using the signals disclosed in FIG. 6, viz., Sign1, M1, block 604 and Sign2, L1, L2, block 606. Using the seven bits required to represent these signals, block 610 simply checks for condition (26) and sets a bit (flag) F=1 if that condition is satisfied.

Both Module α as well as Module β (FIGS. 2,3,4 and 9) individually set flags to indicate whether the residue in each module at the end of step i satisfies this condition. This flag along with the two bits (signals) indicating the sign of the residue are utilized by the decision blocks 206, 306 and 406 to determine the next action as per the pseudo-code indicated above.

If only one of $Z_{i+1}{}^\alpha$ or $Z_{i+1}{}^\beta$ satisfies the BTP condition, then it is the correct residue and the current branching terminates. If both $Z_{i+1}{}^\alpha$ and $Z_{i+1}{}^\beta$ satisfy the above condition, then either of the two modules can be arbitrarily deemed to be correct and the current branching terminates.

To summarize, starting with the initial argument $Z_0$ the zeroing part of the proposed new algorithm computes two sequences of residues $Z_{i+1}{}^\alpha$ and $Z_{i+1}{}^\beta$ where $$i = 0, 1, \ldots, \left\lceil \frac{n+3}{2} \right\rceil.$$

It can be proved [3] that at every step i, the residues satisfy the conditions $$|Z_i^\alpha| \leq \sum_{k=2i}^{\infty} \arctan 2^{-k} \text{ OR } |Z_i^\beta| \leq \sum_{k=2i}^{\infty} \arctan 2^{-k} \quad (27)$$

$$|Z_i^\alpha| \leq 3 \cdot 2^{-(2i-1)} \text{ AND } |Z_i^\beta| \leq 3 \cdot 2^{-(2i-1)} \quad (28)$$

Note that $$\sum_{k=2i}^{\infty} \arctan 2^{-k} < 2^{-(2i-1)} < 3 \cdot 2^{-(2i-1)} \quad (29)$$

so that the residue magnitude bound specified by inequality (28) is "coarser" than that specified by (27) above. Hence the bound expressed by relation (28) is referred to as the "coarser" bound while the bound specified by condition (27) is referred to as the "tighter" bound.

The above relations (27) and (28) state that at any step i, at least one of $|Z_i^\alpha|$ and $|Z_i^\beta|$ satisfies the "tighter" bound while both satisfy the "coarser" bound. Note that initial argument $Z_0$ must satisfy the "tighter" bound as per the range restriction (20). The fact that all residues always satisfy the "coarser" bound is what makes it possible to evaluate the sign of the residue by analyzing only a fixed number of (i.e., six) leading digits in the sign-evaluation-window. In fact, Table 1 is derived from the fact that the residues always satisfy the "coarser" bound (i.e., relation (28)).

Now, turn to a description of the values that are stored in the ROM look-up table. As previously mentioned, conventional CORDIC methods which can only single step in each iteration must pre-compute and store the values of individual elementary angles arctan $2^{-k}$ where k=0, 1, . . . , (n+1) in a ROM table, where the desired output precision is n bits.

In contrast, the present inventive method always performs a double step. Hence it needs and therefore stores in the ROM look-up table only the sum and difference of each pair of it is angles used in iteration i, for $$i = 0, 1, \ldots, \left\lceil \frac{n+3}{2} \right\rceil.$$

Since a signed digit representation is used, it is trivial to generate (−arctan $2^{-2i}$−arctan $2^{-(2i+1)}$) and (−arctan $2^{-2i}$ +arctan $2^{-(2i+1)}$) simply by negating the sum and difference stored in the ROM.

Thus, for every two elementary angle values stored in the conventional method the inventive method stores their sum and difference. As a result, the size of the look-up table required by the instant method is identical to that required by conventional methods. However, the pre-computation of sum and difference speeds up execution. Thus, the inventive method offers significant speedup potential and requires very little additional hardware.

The Rotator Block

The rotator (also referred to as the X-Y rotator in the literature) part 101 in effect implements the cross coupled recursions in equations (1) and (2), utilizing the factors $s_i$ determined by the zeroing part 100.

In conventional CORDIC methods, at step i, after the factor $s_i$ is determined, an i positions-shifted $Y_i$ is added or subtracted to $X_i$ and vice versa (refer to equations (1) and (2)). The fastest known conventional, single stepping method computes $X_{i+1}$ and $Y_{i+1}$ in parallel in two separate submodules. Each submodule requires one shifter and one adder as the main building blocks.

To speed up the operation, the inventive method performs the rotations more efficiently. To understand the main idea behind the rotator in the method of the present invention, unroll the recursion in equations (1) and (2) one more time (i.e., express $X_{2i+2}$ and $Y_{2i+2}$ in terms of $X_{2i}$ and $Y_{2i}$) to obtain $$X_{2i+2}=(X_{2i}-s_{2i}2^{2i}Y_{2i})-s_{2i+1}2^{-(2i+1)}(Y_{2i}+s_{2i}2^{-2i}X_{2i})=X_{2i}(1-s_{2i}s_{2i+1}2^{-(4i+1)})-[Y_{2i}(2s_{2i}+s_{2i+1})]2^{-(2i+1)} \quad (30)$$

$$Y_{2i+2}=(Y_{2i}+s_{2i}2^{-2i}X_{2i})+s_{2i+1}2^{-(2i+1)}(X_{2i}-s_{2i}2^{-2i}Y_{2i})=Y_{2i}(1-s_{2i}s_{2i+1}2^{-(4i+1)})+[X_{2i}(2s_{2i}+s_{2i+1})]2^{-(2i+1)} \quad (31)$$

Figure 8:
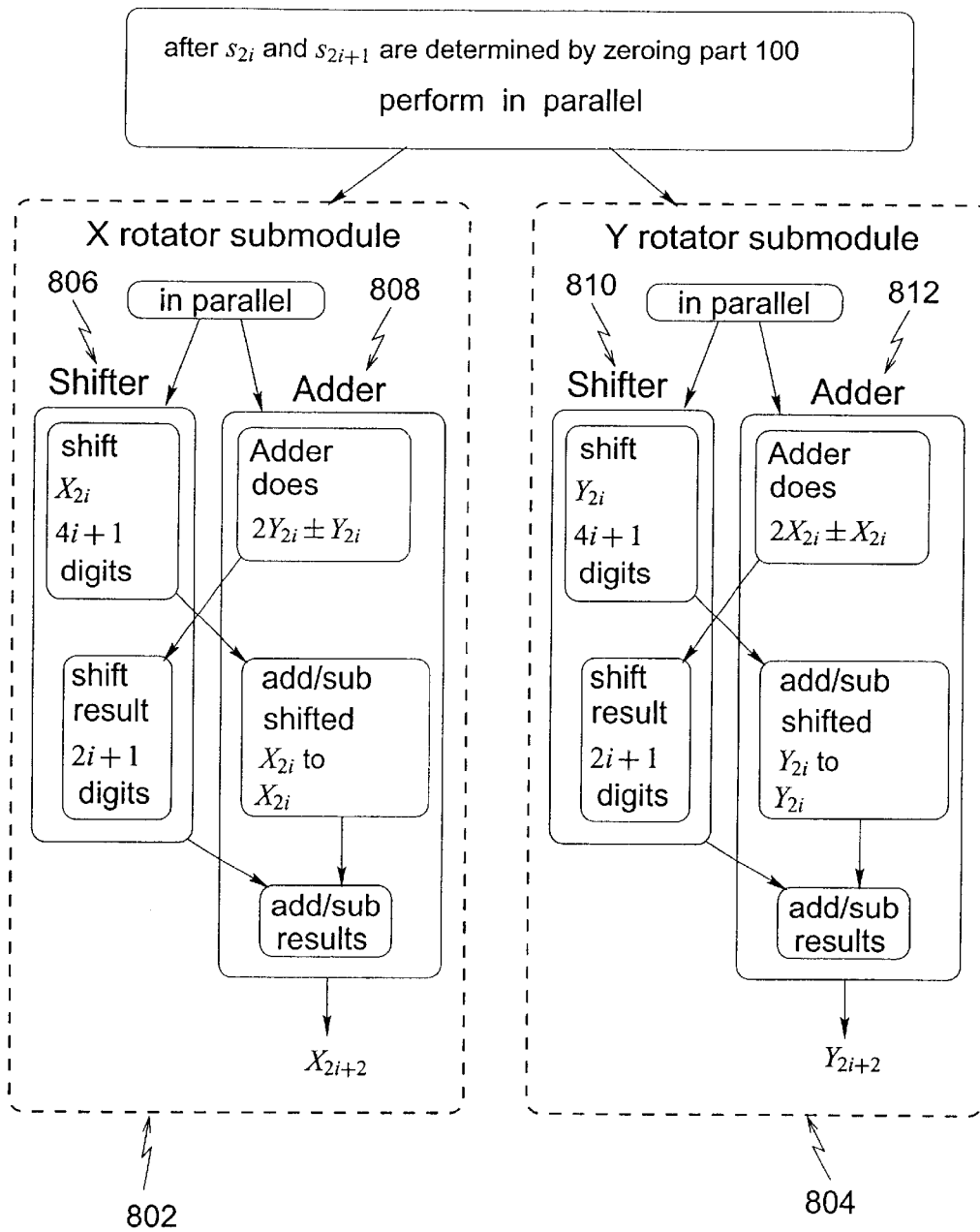
FIG. 8 shows the details of the hardware organization of the rotator modules.

The above equations express $X_{2i+2}$ and $Y_{2i+2}$ in terms of $X_{2i}$ and $Y_{2i}$ and can be implemented as shown in FIG. 8. Note that $s_{2i}$ and $s_{2i+1}$ which determine whether to add or subtract arctan $2^{-2i}$ and arctan $2^{-(2i+1)}$, respectively, are determined in step i in the zeroing part 100.

Figure 9:
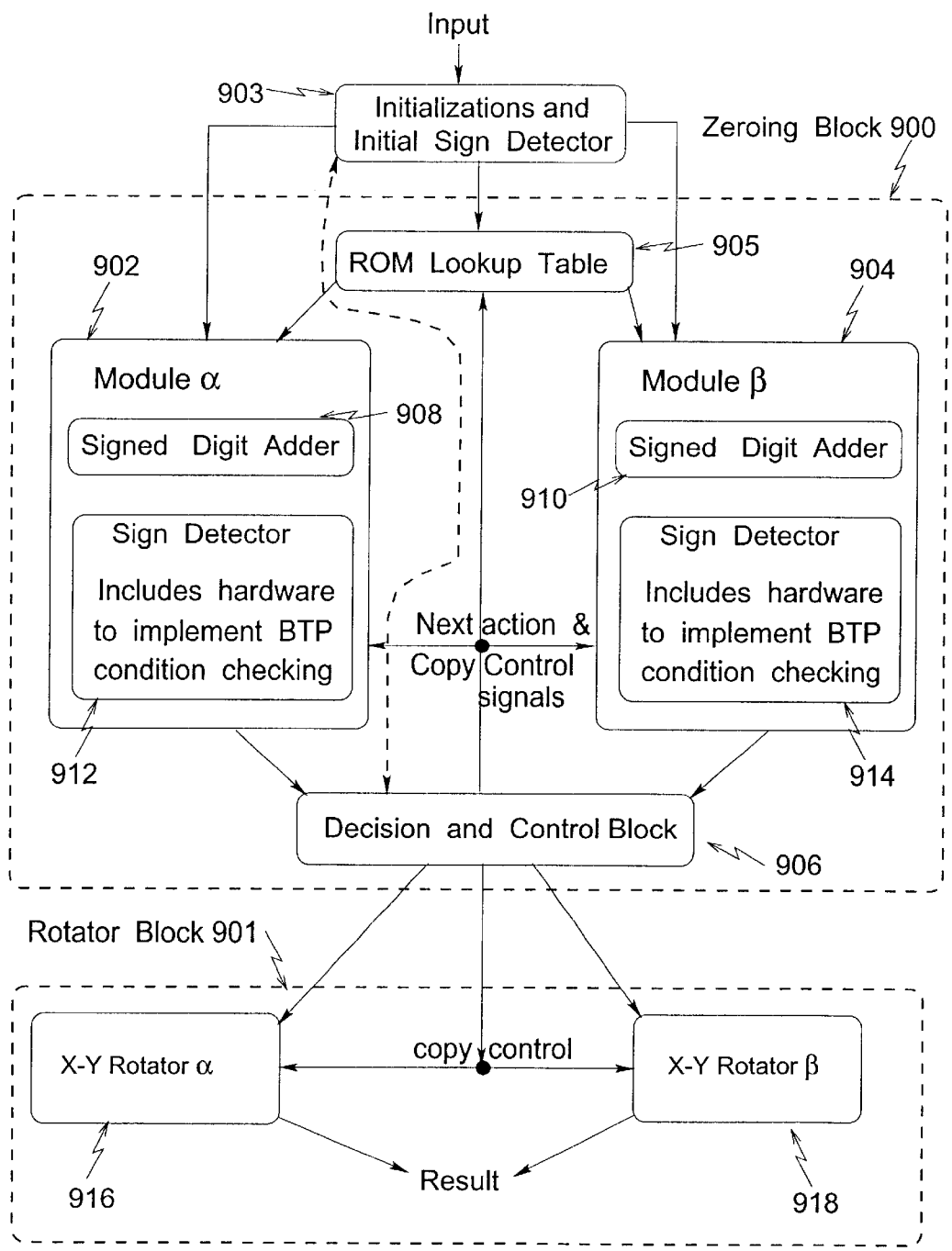
FIG. 9 shows the overall architecture of VLSI hardware to implement the algorithm, which can be incorporated as a. VLSI core in any digital computer/processor/controller, etc.

These two values are then utilized by the rotator part 101. Rotator part 101 also consists of two modules as shown in FIG. 9. Rotator α module 916 works in tandem with 902, Module α in the zeroing part 100, and uses the $s_{2i}{}^\alpha$ and $s_{2i+1}{}^\alpha$ values generated by Module α, block 902. Likewise, Rotator β module 918 works in tandem with Module β, 904 in the zeroing part 100 and uses the $s_{2i}{}^\beta$ and $s_{2i+1}{}^\beta$ values generated by block 904.

Each of the two rotator modules α and β, 916 and 918, respectively, has the internal organization illustrated in FIG. 8. Each rotator module consists of two submodules 802 and 804. Submodule 802 holds the $X_k$ values as they evolve over the iterations; and submodule 804 holds the $Y_k$ values. Submodules 802 and 804 must feed the X and Y values currently being held to each other in order to implement equations (30) and (31) to calculate the new X and Y values. This happens because the underlying fundamental relations (1) and (2) are cross-coupled, (i.e., the next or new value of X depends the current value of Y as well, and vice versa). At the end of the iterations, the $X_n$ output of submodule 802 holds the final value of cosine($Z_0$) accurate up to n bits. Similarly, $Y_n$, the output of submodule 804 holds the final value of sine($Z_0$) accurate up to n bits.

As seen in FIG. 8, each submodule 802 and 804 consists of a shifter, 806, 810; an adder, 808, 812, and a few latches/registers not shown in the Figure. Within submodule 802, the shifter 806 and the adder 808 operations are shown inside the corresponding boxes. When shifter 806 is busy performing shifts, the adder 808 is also busy since they work in parallel. Likewise, shifter 810 and adder 812 also work in parallel within submodule 804. This parallel operation reduces idle time and thereby speeds up the function evaluation. In contrast, in conventional CORDIC methods, shifters and adders cannot work in parallel: the adders must wait for shifter outputs and vice versa. As a result, when the shifters are busy, the adders are idle and vice versa, which leads to inefficient hardware utilization and slow execution. The present invention avoids these inefficiencies and leads to faster execution and far better hardware utilization.

Those familiar with the art will appreciate that these Flowcharts, Figures, Tables and rules are sufficient to realize a VLSI hardware implementation of the invented method, as illustrated hereinafter.

Hardware Architecture to Implement the Inventive Algorithm

FIG. 9 illustrates the architecture to implement the inventive method in hardware. The main constituents are the Zeroing Block 900 and the Rotator Block 901.

At the beginning, block 903 performs range checks, initializations and initial sign detection of the input angle $Z_0$. In other words, the functions indicated in block 103 (FIG. 1) are implemented. The zeroing block 900 implements the functions in blocks 100 and 104 in FIG. 1. Two identical modules, viz., Module α, labeled 902 and Module β, 904, are provided to carry out the two independent computation sequences in each iteration. Each module 902, 904, contains a sign-digit adder 908, 910, respectively, which adds n+3 digits long operands; and the sign and branch-termination-predictor condition evaluation hardware 912, 914, respectively, as the main components. Each module also contains registers and latches (not shown) for storing intermediate results. The sign-evaluation hardware includes components to select the six residue digits in the appropriate position, based on the iteration number, as shown in FIG. 5. It also includes hardware to implement blocks 604, 606, 608 and 610 (FIG. 6).

In each iteration i, each module 902, 904 produces a new residual angle value $Z_{i+1}$, its sign and a flag indicating whether the newly calculated $Z_{i+1}$ satisfies the branch-termination-predictor condition. The decision block accepts the sign and BTP condition indicator flags from both modules and determines whether one of the modules performed incorrect computation. If so, the incorrect computation is discarded and the correct value of $Z_{i+1}$ and its sign are retained in both modules 902, 904 for the next iteration. Likewise the $s_{2i}$ and $s_{2i+1}$ values which led to the correct computation are stored and forwarded to the rotator part 901. If none of the computations can be ruled out as incorrect, the algorithm is in a branching which is indicated by setting a bit flag. While in a branching, both modules 902, 904 continue to execute two independent computation sequences. Neither of the modules 902, 904 copies the other module's results at the end of an iteration when in branching. Since neither can be ruled out as incorrect, the $s_{2i}$ and $s_{2i+1}$ values from both modules 902, 904 are forwarded to the rotator part 901. In other words, Rotator α uses $s_{2i}{}^\alpha$ and $s_{2i+1}{}^\alpha$ to carry out its rotations; whereas Rotator α uses $s_{2i}{}^\beta$ and $s_{2i+1}{}^\beta$. A branching will either terminate eventually when one of the two sequences of computations can be deemed to be incorrect or, if it continues till the end of iterations, then both modules 902, 904 lead to correct output values, accurate up to the specified number of bits.

The loop initialization and conditionals shown in block 104 (FIG. 1) can be incorporated in decision and control block 906, which combines the functions indicated in 206, 306, 406 and 104 and determines the course of action for the "next" iteration.

Using the $s_{2i}$ and $s_{2i+1}$ factors determined by the the zeroing part 900, the rotator modules perform the X-Y rotations expressed by equations (30) and (31). At the end of the $$\left\lceil \frac{n+3}{2} \right\rceil$$

iterations, the rotator modules hold the sine and cosine values. If the algorithm is not in a branching at the end of the iterations, then one of the rotator modules (α or β) holds the correct cosine and sine values. The correct module is indicated by a bit-flag set by the decision block 906. If the algorithm ends in a branching, then both rotator modules α and β hold cosine and sine values that are accurate to the desired precision.

Figure 10:
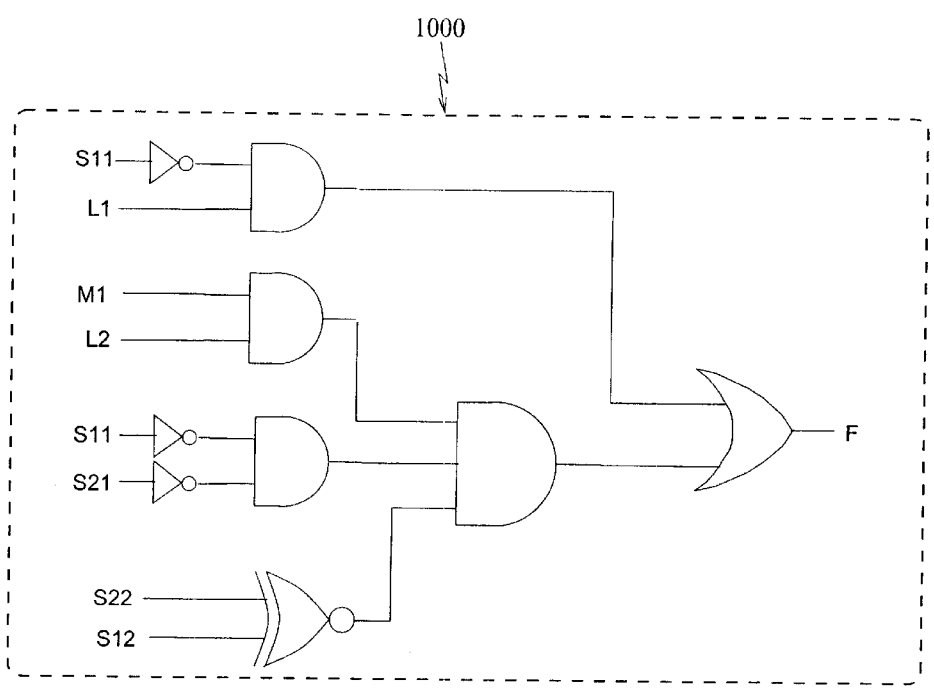
FIG. 10 illustrates one possible hardware implementation of sub-block 610.

A sample hardware realization of block 610 (FIG. 6) is illustrated in FIG. 10. The purpose of this figure is to demonstrate that (i) a hardware implementation can actually be simpler than what the flowcharts and math might suggest; and (ii) this document is detailed enough for those familiar with the art to synthesize hardware implementations.

The hardware realizable form of the branch-termination-predictor condition checking presented in equation (26), is synthesized into the simple logic gate diagram shown in FIG. 10. Those familiar with the art will appreciate that the gate diagram 1000 can be immediately and automatically translated into VLSI layouts and chips by today's CAD tools.

As indicated above, block 610 uses Sign1, M1 (generated by block 604) and Sign2, L1, L2 (generated by block 606) and outputs the bit flag F which is set to "1" if the residue satisfies the branch-termination-predictor condition. Bit flag F is set to 0 otherwise. As noted before, Sign1 and Sign2 require two bits to represent them. The most efficient encoding to represent the three values {−1, 0, +1} that a sign can take is:

"00" represents the value 0,
"01" represents a +1, and
"11" represents a −1

The circuit 1000 assumes that the pair (S12, S11) represents Sign1 and (S22, S21) represents Sign2 and that the above encoding of sign values is employed. Bit flags M1, L1, L2 have been explained above. The signal "F" is the output of block 610.

Comparison with conventional Methods

As evidenced by the references cited in the document, CORDIC algorithms have continued to evolve since the original work of Volder in 1959 [1]. The enhancements in the 90s were significant [4,5]. Before the present invention, the method presented by Duprat and Muller [5] was the fastest known. Hence, the words "conventional method", indicate "the method developed by Duprat and Muller [5]". The resulting comparison is the most conservative (i.e., it under-emphasizes the merits and advantages of the invention).

In VLSI, the efficiency of a circuit is measured in terms of the execution delay and the chip or VLSI area the circuit requires. The area in turn depends on the amount of hardware (i.e., components, gates, etc.) required as well as the interconnection patterns. In the following discussion, I therefore compare the double stepping method of the present invention vis-a-vis the conventional method in terms of the delay and area metrics.

(a) Execution Delay

The shift required in CORDIC rotations in blocks 806 and 810 (FIG. 8) is variable. The number of positions to be shifted at each iteration is different, because the shift is a function of the iteration index. Hence, a general purpose shifter that can shift from one position all the way through n positions (n being the word length) is required. Barrel shifters or crossbar switches have such capabilities. However, these shifters are complex and are likely to require a delay dependent on the word length: typically O(log n), which means "on the order of or about (log n) for large values of n". The main point is that the shifter delay is likely to be comparable to (if not longer than) the adder delay, since a signed digit addition takes a (small) fixed amount of time delay independent of the wordlength.

Since any CORDIC method fundamentally consists of zeroing and rotator parts, consider the execution delays of each part.

(i) Zeroing Block: The delay required for executing two steps in the zeroing modules in the conventional method is equivalent to a sequence of {sign-detect, add, sign-detect, add} operations. The {sign-detect} operation in the conventional method utilizes a window of three leading digits. The delay required by the decision block; copy operations that are performed whenever the output of one of the modules can be detected to be wrong in which case that module copies the output of the correct module; and latching is also included along with the delay of the {sign-detect} operation for the sake of simplicity.

In comparison, the delay required for executing one double stepping iteration in the zeroing part 900 of the inventive method is equivalent to that of {sign-evaluate, add} operations. Instead of storing individual angles arctan $2^{-2i}$ and arctan $2^{-(2i+1)}$, only their sum and difference, viz., (arctan $2^{2i}$+arctan $2^{-(2i+1)}$) and (arctan $2^{-2i}$−arctan $2^{-(2i-1)}$) are stored for the inventive algorithm. Hence, two additions in the conventional method are replaced by a single addition in this double stepping method, leading to a faster execution.

The {sign-evaluate} operation in the inventive method is more complex than that in the conventional method, since the window size is six while the conventional method uses a window of three digits. However, the additional delay required for the sign evaluation in the new method is likely to be small, since it divides the six digits into two subgroups of three digits each and processes them in parallel in blocks 604 and 606 (FIG. 6). The only extra delay is that of deciding the overall sign, block 608, or determining the the branch-termination-predictor condition flag, block 610; whichever of these two parallel operations takes longer time to execute. Since block 610 is likely to take longer execution time than block 608, the only additional delay for the {sign-evaluate} operation in the present method compared with the equivalent sign-detect operation in the conventional method is that of block 610. This is likely to be small and hence the zeroing part of algorithm of the present invention is faster than the zeroing part of the conventional method.

(ii) Rotator Block: The delay required for executing two X-Y rotations in the conventional method is tantamount to a sequence of {shift, add, latch, shift, add, latch} operations. Each rotation needs a shift, an addition and latching as per equations (1) and (2).

The delay required for two X-Y rotations that are performed in a single iteration in the current method can be approximated to that of a sequence of {add, latch, add, latch, add, latch} operations (or {shift, latch, shift, latch, add, latch} operations if the shifter takes a longer time than the adder).

Assuming that (i) the shifter delay is about the same as the adder delay $\Delta_{shift} \approx \Delta_{add}$, and (ii) the delay required for addition $\Delta_{add}$ is longer than the delay required for latching $\Delta_{latch}$, it can be seen that the X-Y rotator part in the double stepping method saves $[\Delta_{add}-\Delta_{latch}]$ of delay for every iteration of the double stepping method, or equivalently, for every two rotations in the conventional method. If the shifter or adder can be pipelined, the speedup could be even better.

Finally, note that in the conventional method, both the zeroing and rotator blocks work in tandem, with the rotator modules utilizing the factor $s_i$ determined by the zeroing module(s). If the {sign-detect} operation in the conventional method (which includes the decision block delay, along with module-to-module copying and latching delays) takes a longer delay than the shift operation (which is highly likely), then it is possible that the X-Y rotator modules could get stuck, waiting for the zeroing module to finish its part.

In contrast, in the double stepping method, the delay of the zeroing part is likely to be smaller than the delay of the X-Y rotator part, so that the rotator modules would never idle. Thus, the double stepping method leads to significantly faster execution time.

(b) Area and Hardware Utilization

Next consider the hardware (area) requirements of and hardware utilization in both methods.

(i) Look-up Table Size: First, note that the look-up table size required by the instant double stepping method remains identical to that of the conventional method. Instead of storing individual angles arctan $2^{-2i}$ and arctan $2^{-(2i+1)}$, only their sum and difference need be stored for the algorithm.

(ii) Rotator Block: In the X-Y rotator part, the double stepping method requires only minimal additional hardware compared with the conventional method. As in the conventional method, the main constituents of each of the X and Y rotator submodules 802 and 804 are one adder and one shifter (FIG. 8). In the conventional method the shifters are idle when the adders are active and vice versa, while in the double stepping method, the adders and shifters work in parallel, virtually eliminating idle time, thereby enhancing hardware utilization. The small additional hardware overhead in the new method arises because the adders and shifters need selectors or multiplexers at their inputs and latches or registers to hold intermediate results.

(iii) Zeroing Block: Implementation of the zeroing part of the double stepping method also uses two modules 902 and 904 (FIG. 9), as in the conventional case. Both modules (in particular, the adders which are full wordlength long) perform distinct and useful operations in every iteration in the double stepping method. In comparison, in the conventional method, the modules in the zeroing part perform distinct operations only when the algorithm is in a branching. One of the modules in the zeroing part essentially remains unutilized whenever the algorithm is not in a branching.

In the present method, six digits are examined instead of three, to evaluate the sign of the residual angle. Hence, the sign detection hardware is more complex than that of the conventional method. Similarly, the decision block is slightly more complex than that of the conventional method. However, the additional circuits in the sign-evaluation and decision blocks act on a fixed and small number of extra digit positions (three digits) and are therefore likely to be small in comparison with the full wordlength long adders, shifters, etc. Hence, the additional hardware required by the present method is very small.

The decision blocks in the flowcharts (FIGS. 1–4) probably appear more complicated in software: the hardware complexity of implementing these blocks is small. As illustrated by FIG. 10, only a few simple logic gates are needed to implement the sub-block 610 within the decision block 906. As yet another example, note that in block 608, the evaluation of the overall sign of the entire group of six digits in the window can be performed with a simple multiplexer. In other words, the if-then-else statements shown in block 608 are implementable in hardware by only a handful of transistors.

Thus, the hardware complexity of the decision block 906 in the inventive method is likely to be somewhat higher but comparable to the hardware complexity of a decision block in the conventional method. The decision block and the sign evaluation circuits together should constitute only a small fraction of the total hardware required, which is likely to be dominated by full word length long adders, shifters, latches and the look-up table. Hence, the additional hardware overhead of the present double stepping method is likely to be small, but worthwhile, since in return, the utilization of large blocks (such as adders and shifters . . . ) can be substantially increased.

In summary, the double stepping method of the present invention has the potential to significantly reduce the execution time while incurring very small hardware overhead, leading to a great improvement in hardware utilization.

REFERENCES

[1] J. E. Volder. "The CORDIC Trigonometric Computing Technique". *IRE Trans. on Electronic Computers*, vol. EC-8, September 1959, pp. 330–334.

[2] Walther, J. S. "A unified Algorithm for Elementary Functions". In *Proceedings of the 38th Spring Joint Computer Conference*, 1971, pp. 379–385.

[3] Phatak, D. S. "Double Step Branching CORDIC: A New Algorithm for Fast Sine and Cosine Generation". *IEEE Transactions on Computers*, vol. TC-47, no. 5, May 1998, pp 587–602.

[4] Takagi, N., Asada, T., and Yajima, S. "Redundant CORDIC methods with a constant scale factor for Sine and Cosine computation". *IEEE Trans. on Computers*, vol. 40, no. 9, September 1991, pp. 989–999.

[5] Duprat, J., and Muller, J. "The CORDIC algorithm: new results for fast VLSI implementation". *IEEE Trans. on Computers*, vol. TC-42, no. 2, February 1993, pp. 168–178.

[6] Koren, I. *Computer Arithmetic Algorithms*. Prentice-Hall Inc., Englewood Cliffs, N.J., 1993.

I claim:

1. A method for high speed evaluation of the sine and cosine of input values using a CORDIC algorithm to produce output values, wherein the input values and output values are accurate up to any fixed precision by performing a sequence of zeroing and rotation operations, the improvements comprising:

a) initializing said input values to provide initialized values;

b) zeroing and rotating said initialized values to produce a set of intermediate values; and c) iteratively zeroing and rotating said set of intermediate values no more than $$\left\lceil \frac{n+3}{2} \right\rceil$$

times to achieve an output precision of at least n bits, where n is an integer, n=1, 2 . . . , to produce subsequent sets of intermediate values, said zeroing operation utilizing pre-computed sums and differences of two successive elementary angles arctan $2^{-2i}$ and angles arctan $2^{-(2i+1)}$ in each iteration i, for i=0, 1, . . . , $$\left\lceil \frac{n+3}{2} \right\rceil.$$

2. The method for high speed evaluation of the sine and cosine in accordance with claim 1, wherein two distinct computations are performed in parallel in each iteration i: one computation using said pre-computed sum of the elementary angles and the other computation using said pre-computed differences of the elementary angles, said computations producing results comprising residues.

3. The method for high speed evaluation of the sine and cosine in accordance with claim 2, the steps further comprising:

d) after said parallel computations are performed, evaluating the signs of the residues in parallel to determine the correctness of each computation; and e) in parallel, checking a branch-termination-predictor (BTP) condition which predicts whether an ongoing or newly starting branching will be terminated in the next iteration.

4. The method for high speed evaluation of the sine and cosine in accordance with claim 3, wherein at least one of the following conditions and resulting actions occurs:

i) one of the two parallel computations is found correct so that the results of the correct computation are retained for the next iteration and the results of the incorrect computation are discarded; and ii) both parallel computations are found correct, resulting in a branching.

5. The method for high speed evaluation of the sine and cosine in accordance with claim 4, wherein said residues comprise residual angles, and sign-evaluation-windows comprising six leading digits of said residual angles resulting from said parallel operations are processed in parallel in order to determine the signs of the residual angles and said branching-termination-predictor condition.

6. The method for high speed evaluation of the sine and cosine in accordance with claim 3, wherein the branch-termination-predictor (BTP) condition is specified at iteration i, by at least the constraint: |residue magnitude| C $2^{-(2i+4)}$ where C $\epsilon\{5,6\}$ and forms derivable therefrom.

7. The method for high speed evaluation of the sine and cosine in accordance with claim 6, wherein at each iteration i, said parallel computations generate residues satisfying a first bound specified by |both residues magnitudes|$32^{-(2i-1)}$ and a second bound specified by the constraint |at least one of the two residues| $\Sigma_{k=2i}^{\infty}$ arctan $2^{-k}$, wherein said first bound is courser than said second bound.

8. The method for high speed evaluation of the sine and cosine in accordance with claim 3, wherein said sign-determination is performed by splitting said six digits into higher and lower significant halves and processing said halves in parallel.

9. The method for high speed evaluation of the sine and cosine in accordance with claim 8, wherein said more significant half of said window of six digits is processed in accordance with a predetermined table of values.

10. The method for high speed evaluation of the sine and cosine in accordance with claim 9, wherein at least one of said initializing step (a), said zeroing and rotating step (b), and said iteratively zeroing and rotating step (c) are performed by hardware.

11. The method for high speed evaluation of the sine and cosine in accordance with claim 10, wherein said predetermined table of values comprises a ROM look-up table comprising:

a) no more than (n+3) entries, each of length no longer than (n+3) bits, in order to guarantee output precision of at least n fractional bits; and b) for every pair of elementary angles arctan $2^{-2i}$ and arctan $2^{-(2i+1)}$ where $$i = 0, 1, 2, \ldots \left\lceil \frac{n+3}{2} \right\rceil,$$

only the sums and difference of said elementary angles;

and wherein said hardware further comprises means for generating $-(\arctan 2^{-2i} \arctan 2^{-(2i+1)})$ and $-(\arctan 2^{-2i} - \arctan 2^{-(2i+1)})$ on-the-fly from additive inverses of said pairs of elementary angles, said additive inverses being stored in the ROM.

12. The method for high speed evaluation of the sine and cosine in accordance with claim 10, wherein at each iteration i of zeroing and rotating step (c) operations are performed by the equations:

$$X_{2i+2}=X_{2i}(1-s_{2i}s_{2i+1}2^{-(4i+1)})-[Y_{2i}(2s_{2i}+s_{2i+1})]2^{-(2i+1)}$$

$$X_{2i+2}=Y_{2i}(1-s_{2i}s_{2i+1}2^{-(4i+1)})+[X_{2i}(2s_{2i}+s_{2i+1})]2^{-(2i+1)}$$

and wherein said hardware comprises:

a) X-Y rotator means comprising two submodules operating in parallel, one updating X values and the other updating Y values; and b) a submodule comprising shifter means and an adder, wherein, in iteration i, said shifter performs a (4i+1) position shift of an input value applied thereto while, in parallel, said adder adds said input value to a one position, left shifted copy of said input value; after which the adder and shifter both provide their respective outputs to each other in parallel, and the shifter performs a (2i+1) position shift of an input applied thereto while the adder performs at least one of the operations of addition and subtraction, after which the adder adds its output to an output of the shifter.

13. The method for high speed evaluation of the sine and cosine in accordance with claim 1, wherein the last iteration of said iteratively zeroing and rotating step (c) is performed by at least one of the processes:

i) in a branching operation resulting in both said parallel computations generating sine and cosine values accurate to at least n bits; and ii) outside a branching operation resulting in one of said parallel computations generating sine and cosine values accurate to at least n bits.

* * * * *